(12) United States Patent
Connolly, Jr. et al.

(10) Patent No.: US 11,663,117 B2
(45) Date of Patent: May 30, 2023

(54) CUSTOMIZABLE DECISION SERVICE

(71) Applicant: Optimizely, Inc., San Francisco, CA (US)

(72) Inventors: Michael James Connolly, Jr., San Francisco, CA (US); Michael Carlyle Davis, San Jose, CA (US)

(73) Assignee: OPTIMIZELY, INC., San Francisco, CA (US)

( * ) Notice: Subject to any disclaimer, the term of this patent is extended or adjusted under 35 U.S.C. 154(b) by 344 days.

(21) Appl. No.: 17/140,907

(22) Filed: Jan. 4, 2021

(65) Prior Publication Data

US 2022/0214964 A1 Jul. 7, 2022

(51) Int. Cl.
*G06F 9/44* (2018.01)
*G06F 11/36* (2006.01)
*G06F 9/54* (2006.01)
*H04L 67/56* (2022.01)

(52) U.S. Cl.
CPC .......... *G06F 11/3696* (2013.01); *G06F 9/547* (2013.01); *G06F 11/3664* (2013.01); *H04L 67/56* (2022.05)

(58) Field of Classification Search
None
See application file for complete search history.

(56) References Cited

U.S. PATENT DOCUMENTS

| 9,451,006 | B1* | 9/2016 | Miller | G06F 9/451 |
| 10,462,239 | B1* | 10/2019 | Xu | H04L 67/535 |
| 2018/0181484 | A1* | 6/2018 | Jambu | G06F 11/3688 |
| 2022/0129372 | A1* | 4/2022 | Lindon | G06F 11/3006 |

OTHER PUBLICATIONS

CN 110955449, Eng translation (Year: 2020).*

* cited by examiner

*Primary Examiner* — Insun Kang
(74) *Attorney, Agent, or Firm* — Womble Bond Dickinson (US) LLP

(57) ABSTRACT

A method of executing an A/B testing service comprises deploying an instance of the A/B testing service between a client device and an A/B testing server and receiving by the A/B testing service from the A/B testing server a software development kit (SDK) key for a client device, the SDK key indicating an A/B testing environment to be associated with the instance. The method further comprises, in response to receiving the SDK key: storing data associated with the A/B testing environment in memory of the client device; providing a HyperText Transfer Protocol (HTTP) application programming interface (API) associated with the instance of the A/B testing service to one or more applications associated with the A/B testing environment; and executing, by a processing device, commands between the client device and the one or more applications on behalf of the A/B testing environment.

20 Claims, 9 Drawing Sheets

CUSTOMIZABLE DECISION SERVICE

FIELD OF TECHNOLOGY

The embodiments described herein pertain in general to an A/B testing service and more particularly to a customizable-decision A/B testing service.

BACKGROUND

Content variation testing is a type of experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations is measured (for example, whether a user clicks on a button or a variation of a button), and the effects of the modifications to a web page (or its elements) that produce positive or negative results are determined. The positive results associated with a particular modification to a web page validates that the modification to the web page should be used in a production version of the web page. A variety of internal and external platforms may be used in conjunction for variation testing of a web page.

Figure 1:
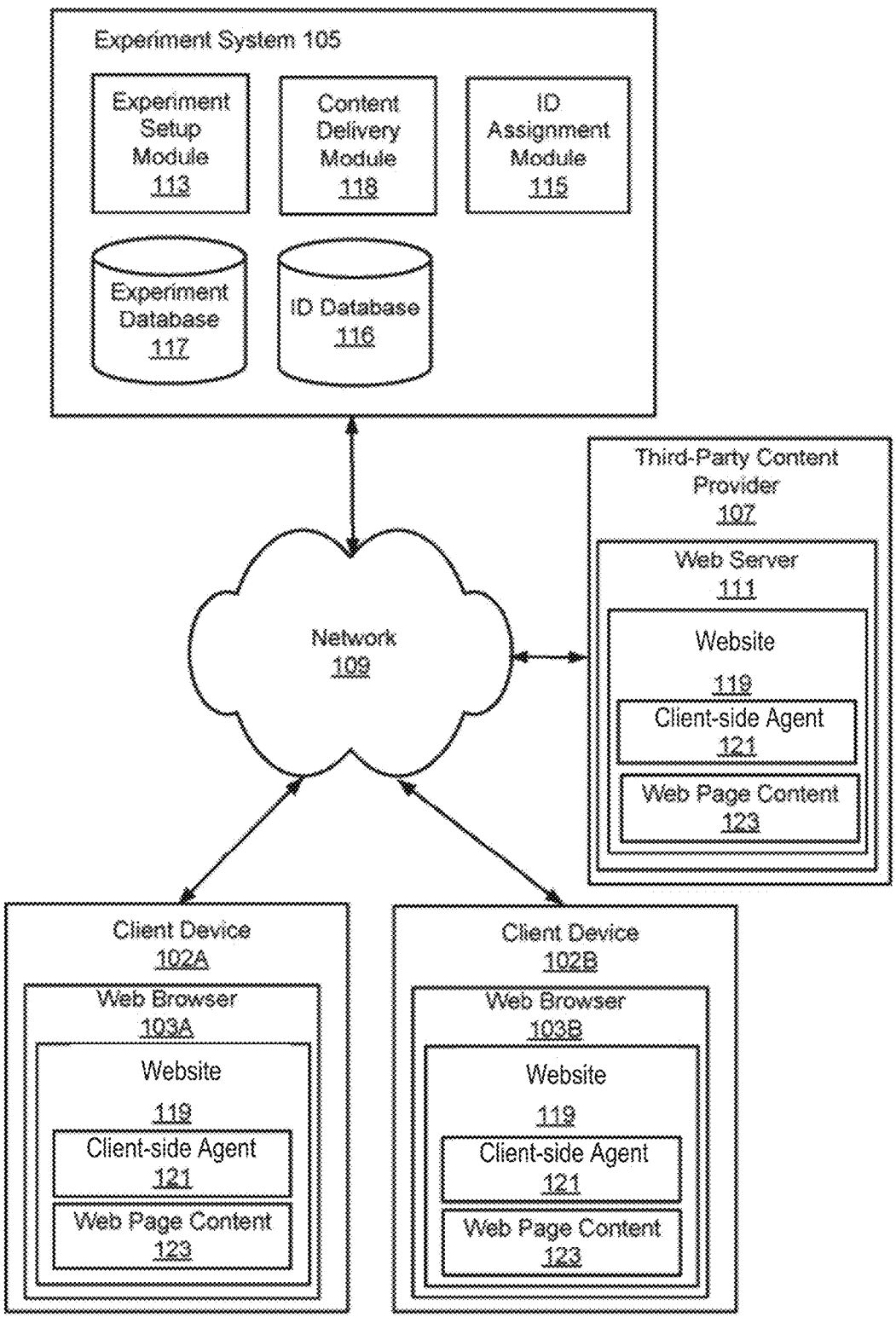
FIG. 1 is a block diagram of an experiment system environment, according to one embodiment.

The FIGs. depict an embodiment for purposes of illustration only. One skilled in the art will readily recognize from the following description that alternative embodiments of the structures and methods illustrated herein may be employed without departing from the principles described herein.

DETAILED DESCRIPTION

Content providers may run content experiments such as A/B tests (e.g., variation testing) to answer specific questions regarding which variation of a content item such as a web page or digital product (including various features) is more successful. Many content experiments include visitor criteria that determines whether a visitor is eligible for the experiment and if so, which variations of the content experiment should be shown to the visitor. The systems that implement these content experiments may be implemented in the backend of the content provider's system or as a separate node that communicates with the back end of the content provider's system. Simultaneously, content providers may bring up content delivery networks (CDNs) in the front-end of their systems to provide for content caching, including caching of content experiment variations.

The embodiments provided herein describe a decision service (e.g., "an agent"), which may be a stand-alone, open-source, and highly available microservice that provides major benefits over using software development kits (SDKs) in certain use cases. In one embodiment, the agent Representational State Transfer (REST) application programming interface (API) offers consolidated and simplified endpoints for accessing all the functionality of a full suite of A/B testing SDKs.

In one embodiment, A/B testing systems may allow users to embed a set of SDKs in applications to run experiments and manage feature flags. Such SDKs may be offered in a number of languages and may map to a particular pattern of implementation and pattern of usage, in which the SDK may be embedded directly into a program. Advantageously, this may allow for a testing library to be included and deployed in the same application in which users they are developing experiments or features. For a variety of reasons, some users would prefer to implement flagging and testing as an application itself, e.g., as a standalone service, and then to enable communication between the client application for the application that is consuming feature flag and the feature flag service via a Hypertext Transfer Protocol (HTTP) API.

Advantageously, the embodiments provided herein allow for such a solution. The decision service described herein provides a user with a fully functional standalone service out of the box. So the user can download the decision service (e.g., from a repository) and run the decision service from the source. In one embodiment the decision service may have functional parity with a suite of testing service SDKs and also may introduce some improvements to what such SDKs offer. In another embodiment, the decision service will compliment additional services from SDKs.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. In one embodiment, experiment system includes one or more experimentation platforms to configure experiments and/or program management platforms to manage the experiment system. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

The network 109 enables communication among the entities connected to it. In one embodiment, network 109 is the Internet and uses standard communications technologies and/or protocols. Thus, network 109 can include links using technologies such as Ethernet, Wi-Fi (e.g., 802.11), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (NIPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). The web browser 103 is a computer program stored on a client device 102 that allows the user of client 102 to access web pages on the World Wide Web such as websites 119 provided by the third-party content provider 107. Suitable web browsers include, but are not limited to, GOOGLE CHROME®, MICROSOFT INTERNET EXPLORER®, MICROSOFT EDGE®, MOZILLA FIREFOX®, and APPLE SAFARI®. In addition to web browsers, a client device may process a web page in an environment like NODE.JS, in which an experiment system and other third-party content providers may execute JavaScript code in an interpreter with support for microtask and macrotask queues.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 are included as part of a website 119 (e.g., a dynamic website or application). For example, the content provider 107 may provide content items such as navigation bars, backgrounds, call to action buttons, links, CSS styles, pop-ups, video, audio, a combination of video and audio, still images (e.g., JPEG), text documents, advertisements, and/or any other types of content. For purposes of convenience and the description of one embodiment, the content items provided by the content provider 107 will be referred to as a single-page web pages, but no limitation on the type of content items are intended by this terminology. In one embodiment, a single-page web page refers to a view of a website 119. For example, a single-page web page may be the initial view of a website 119 when the user first loads the website 119 or the view when the user navigates over a navigation bar element and a menu is displayed in response to the navigation over the navigation bar. In other embodiments, a single-page web page may refer to any other type of dynamic website or dynamic application.

In one embodiment, the content provider 107 operates in conjunction with the experiment system 105 to perform variation testing on a website 119 containing one or more single-page web pages. In one embodiment, the content provider 107 sends a single-page web page to client devices 102 together with a client-side experimentation agent 121, which includes or subsequently downloads from the experiment system 105 conditions and instructions for modifying the single-page web page. A variation test for a single-page web page of a website 119 tests changes to the single-page web page against the current variation of the single-page web page (e.g., the original version of the single-page web page) to determine how the variation alters user interaction with the web page or whether the changes produce a desired result. An example of a desired result resulting from a change to a single-page web page is an increased interaction with the web page such as an increased selection of an advertisement(s) included in the single-page web page or increased purchases of a product advertised on a single-page web page. Thus, variation testing validates a new design of a single-page web page or changes on elements on the single-page web page before the new design or changes are put into production by the content provider 107.

For a given single-page web page, the content provider 107 may have an associated smart page that includes one or more variations of the single-page web page that are used in a variation test for the single-page web page. In one embodiment, a variation test of a single-page web page involves an experiment that tests control "A" and a variation "B" on users requesting the single-page web page from the content provider 107. For ease of discussion, the embodiments discussed herein describe a web page having only two variations: the control and the variant. However, in other embodiments, a single page web page can have any number of variations.

Figure 2B:
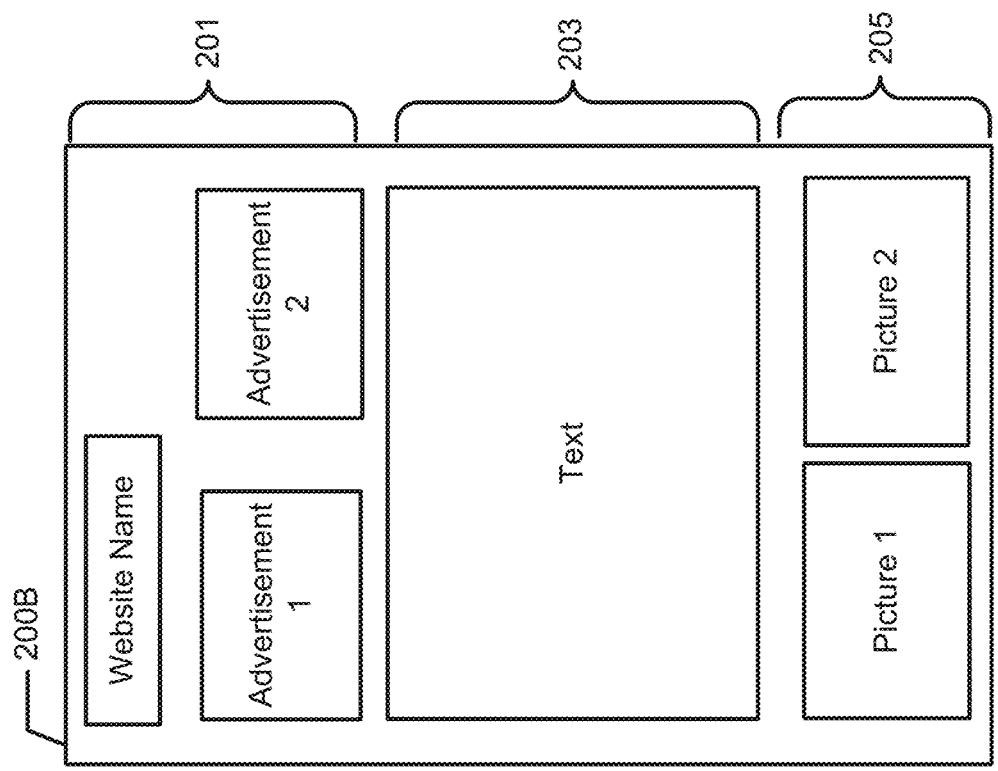
FIGS. 2A and 2B are example variations of a web page, according to one embodiment.
Figure 2A:
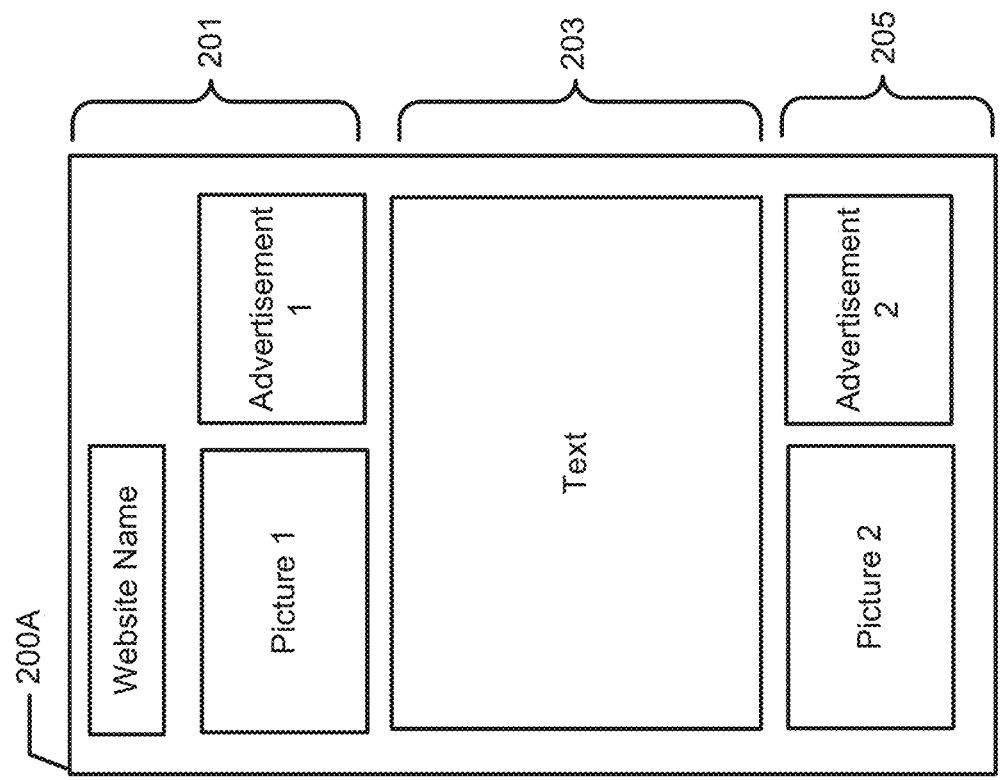

FIG. 2A is example "A" (e.g., the control) of a single-page web page 200A that represents the current implementation of the single-page web page provided by content provider 107. The control of the single-page web page 200A includes a website name of the website associated with the single-page web page, a first picture, and a first advertisement. The website name, the first picture, and the first advertisement are located in an upper portion 201 of the control of single-page web page 200A according to one embodiment. The control of single-page web page 200A also includes textual content located in a central portion 203 of the control of single-page web page 200A and the control of the single-page web page 200A also includes a second picture and a second advertisement located at a lower portion 205 of the control of the single-page web page 200A.

FIG. 2B is example "B" (e.g., the variant version) of a single-page web page 200B. The variant of the single-page web page represented by web page 200B includes a change (i.e., a modification) to the control of the single-page web page 200A shown in FIG. 2A. The variant of single-page web page 200B includes the website name, a first advertisement, a second advertisement, textual content, a first picture, and a second picture similar to the control of the single-page web page 200A shown in FIG. 2A. However, the variant of single-page web page 200B includes the second advertisement positioned in the upper portion 201 of single-page web page 200B whereas the second advertisement is positioned in the lower portion 205 in the control of the single-page web page 200A. In one embodiment, the variation test using the control and the variant of the single-page web page is conducted to determine whether the second advertisement receives more selections when the second advertisement is located at the lower portion 205 of the single-page web page as shown in FIG. 2A or when the second advertisement is located at the upper portion 201 of the single-page web page as shown in FIG. 2B. Noteworthy, any content of 201, 203, and 205 may be dynamic content that changes in according with a variety of conditions, as discussed herein.

Referring back to FIG. 1, in one embodiment the content provider 107 includes a web server 111. In one embodiment, the web server 109 links the content provider 107 to one or more client devices 102 and the experiment system 105 via the network 109. The web server 111 serves websites 119, as well as other web related content 123 for the website 119, such as Java, Flash, XML, and so forth. The web server 111 may include a mail server or other messaging functionality for receiving and routing messages between the experiment system 105 and one or more client devices 102. In one embodiment, a website 119 provided by the web server 109 may include a client-side experimentation agent 121. The client-side experimentation agent 121 may be added to the website 119 by the third-party content provider 107 in one embodiment. The client-side experimentation agent 121 comprises code that loads experiment variation instructions from the experiment system 105.

As shown in FIG. 1, the variant testing system environment 100 also includes an experiment system 105. In one embodiment, the experiment system 105 establishes and conducts variation experiments for web pages included in websites 119 served by third party providers 107. In one embodiment, the experiment system 105 includes an experiment setup module 113, an ID assignment module 115, an ID database 116, an experiment database 117, and a content delivery module 118, according to one embodiment. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by one or more computer processors. Additionally, those of skill in the art will recognize that other embodiments of the experiment system 105 shown in FIG. 1 can have different and/or other modules than the ones described here, and that the functionalities can be distributed among the modules in a different manner.

In one embodiment, the experiment setup module 113 establishes experiments for websites 119 provided by the third-party content provider 107. The experiment setup module 113 receives input from an affiliate (e.g., an employee) of the third-party content provider 107 to establish a variation experiment for a single-page web page of a website 119 provided by the third-party content provider 107. In one embodiment, establishing a variation experiment for a single-page web page of a website 119 includes configuring a smart page for the single-page web page. In one embodiment, a smart page for a single-page web page is a set of instructions that describe when to activate a variation experiment associated with the single-page web page. The smart page may include one or more triggers and one or more conditions configured by the affiliate of the third-party content provider 107 that impact when variations of the associated single-page web page are selected and presented to a client device 102.

A smart page for a single-page web page may define one or more conditions. In one embodiment, a condition(s) for a smart page is a set of rules related to the state of the single-page web page that must be satisfied before the smart page for the single-page web page will activate. That is, a condition of a smart page describes the state of the world of the single-page web page that can be evaluated as true (i.e., valid) or false (i.e., invalid). Responsive to a condition being true, a smart page causes the performance of a specified action. For example, information included in the smart page specifies when and how to present experimental variants of the website 119 to viewing users if a condition in the smart-page is true. If a condition is false, the smart page may be deactivated if the smart page is currently active or the smart page may not be activated if not currently activated.

In one embodiment, a smart page for the single-page web page may also include at least one trigger. In one embodiment, a trigger defines when to evaluate the condition(s) for the smart page. That is, a trigger of a smart page is tied to an event on the single-page web page and signals a client device 102 to evaluate conditions associated with the trigger. Smart pages may include one or more triggers that can be of different trigger types. When a trigger event occurs, the smart page evaluates the corresponding conditions associated with the trigger event.

Figure 3A:
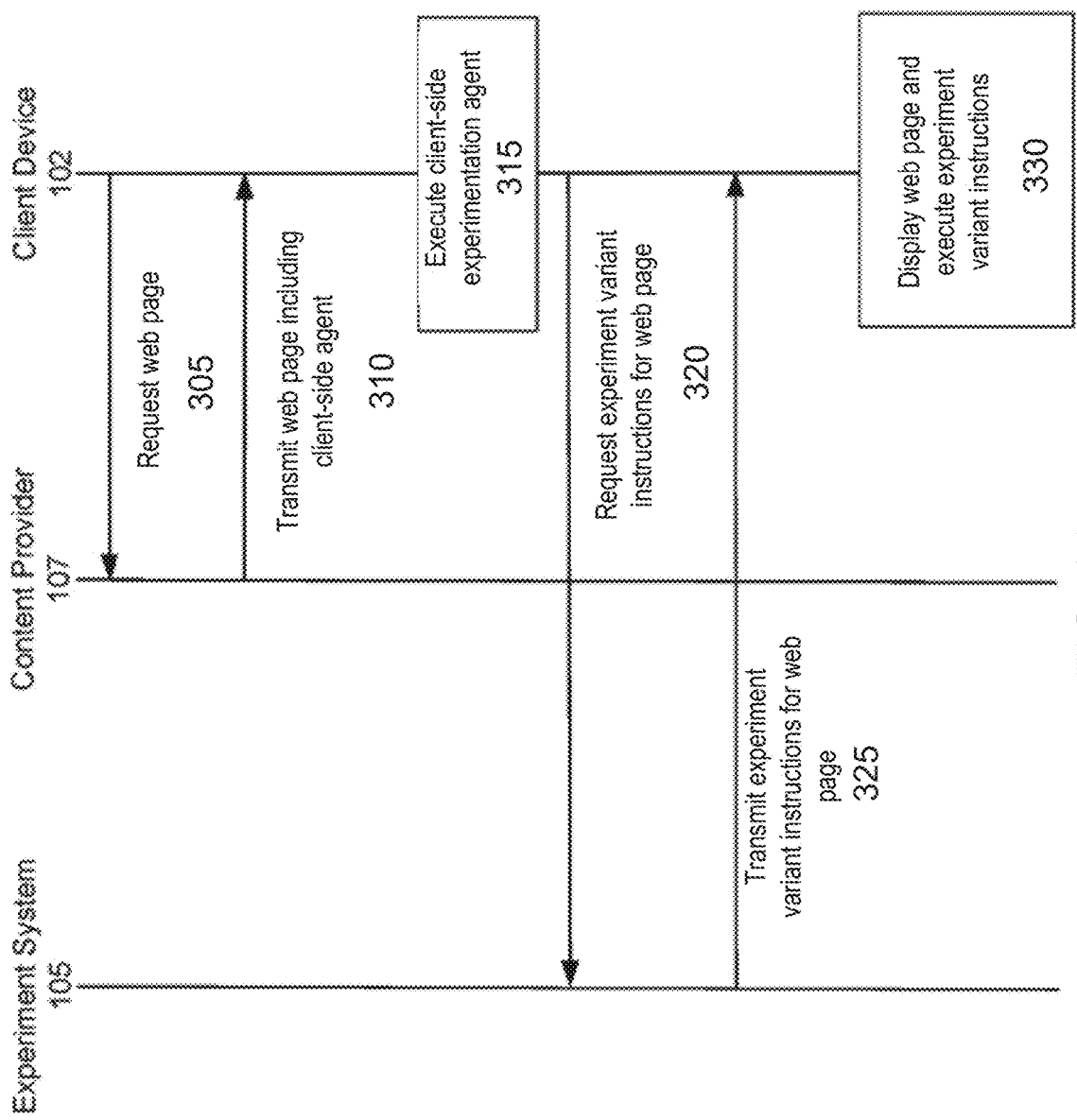
FIGS. 3A-3B are transaction diagrams illustrating interactions between an experiment system, a content provider, and a client device, according to one embodiment.
Figure 3B:
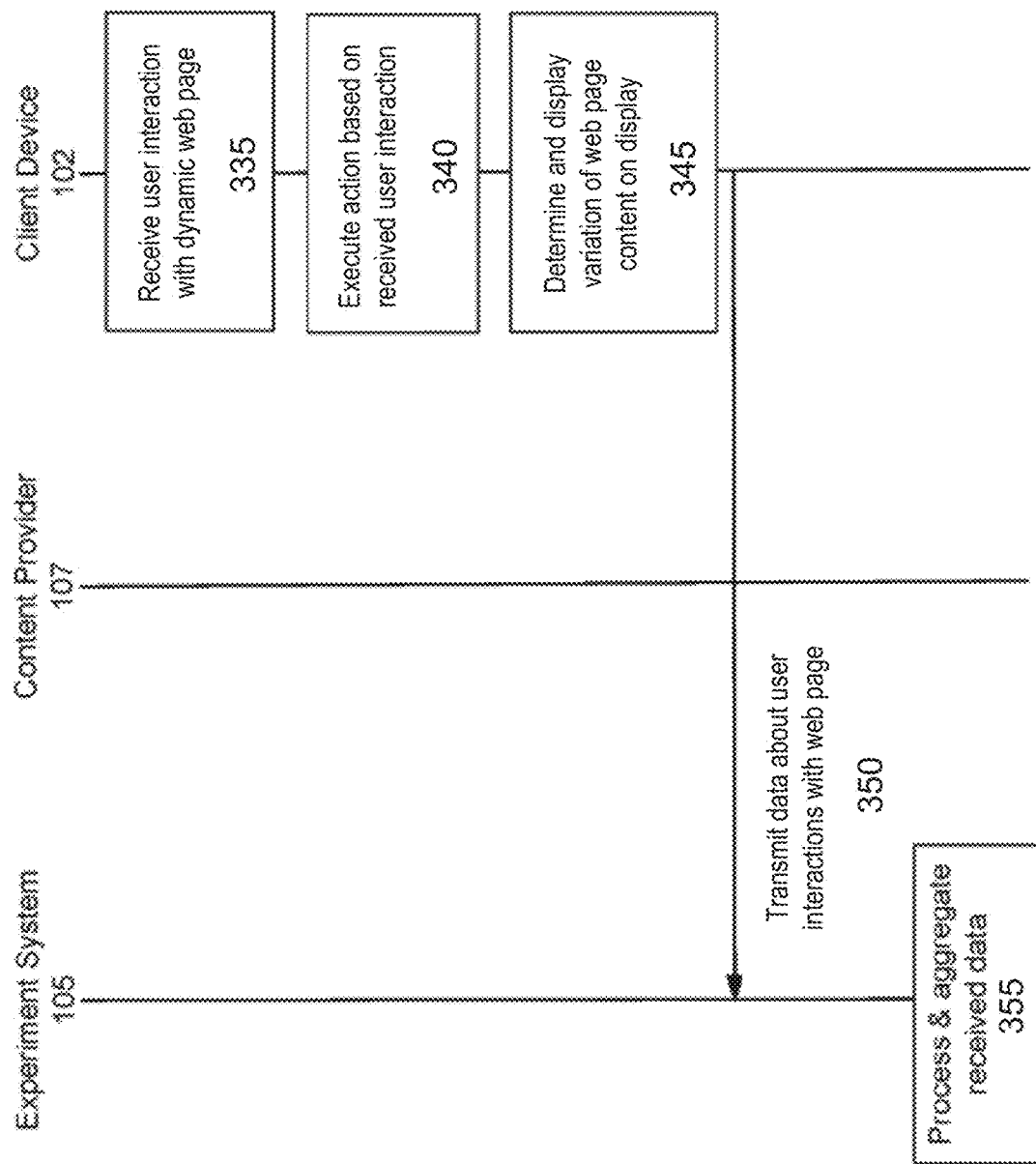

FIGS. 3A-3B are transaction diagrams illustrating interactions between an experiment system 105, a content provider 107, and a client device 102. In one embodiment, the experiment system 105 may be on the client device 102. In another embodiment, the experiment system 105 is separate from the client device 102, as shown. A client device 102 requests 305 a website 119 from a content provider 107. The content provider 107 transmits 310 the website 119 to the client device 102. The transmitted website 119 includes a client-side experimentation agent 121. The client-side experimentation agent 121 includes instructions that cause the client device 102 to retrieve from the experiment system 105 additional configurations or variations to perform alterations on the web page or its content (e.g., web page elements), including, in one embodiment, the triggers and conditions for one or more smart pages. The client device 102 executes 315 the client-side experimentation agent 121 which causes the client device 102 to request 320 instructions for executing experiment variants for a single-page web page of the website 119 from the experiment system 105. The experiment system 105 transmits 325 the experiment variant instructions for the single-page web page of the website 119 to the client device 102. The instructions include the triggers and conditions for the smart pages and where they are stored in the client-side experimentation agent 121 within the web browser 103. The client device 102 displays 330 the single-page web page to a user of the client device 102 and executes the web browser 103 and the client-side experimentation agent containing the experiment variant instructions.

The client-side experimentation agent 121 contains instructions to allow it to interact with the web browser 103, including instructions to interact with the web browser's APIs. For example, the client-side experimentation agent 121 contains instructions to interact with the MutationObserver API. The MutationObserver API provides the ability to watch for changes being made to the DOM tree by identifying a target element. The target element may be a single node in the DOM tree or a subtree including multiple nodes. When a change occurs to the identified target element, such as adding, modifying, and removing nodes or node attributes and modifying text data, additional code can be configured using the MutationObserver API to watch for changes and transmit them to the client-side experimentation agent 121. In another example, the client-side experimentation agent 121 interacts with a site visitor's web browser session history. In one example, the client-side experimentation agent 121 detects when a URL changes even if the full page does not reload in order to execute experiments.

Referring to FIG. 3B, the client device 102 receives 335 a user's interactions with the website 119 that has been loaded onto the browser running on the client device 102. For example, the client device 102 identifies a user interaction of clicking or selecting a menu item of the single-page web page and passes the user interaction to the browser for execution by the website 119. In another embodiment, the client device 102 executes 340 an action associated with the user interaction in the browser. The action executed by the client device 102 includes displaying the selected menu item (e.g., updating an element of the web page). The client device 102 determines 345 a variation of the single-page web page to display (e.g., including a variation of an element to display) to the user based on the experiment variant instructions and the user interactions. Responsive to the client device 102 displaying the determined variation of the single-page web page, the client device 102 using the client-side experimentation agent may monitor for changes to the state of the single page web application 119 and transmit 350 data associated with user interactions with the single-page web page to the experiment system 105. The experiment system 105 processes and aggregates 355 the received data.

Figure 4:
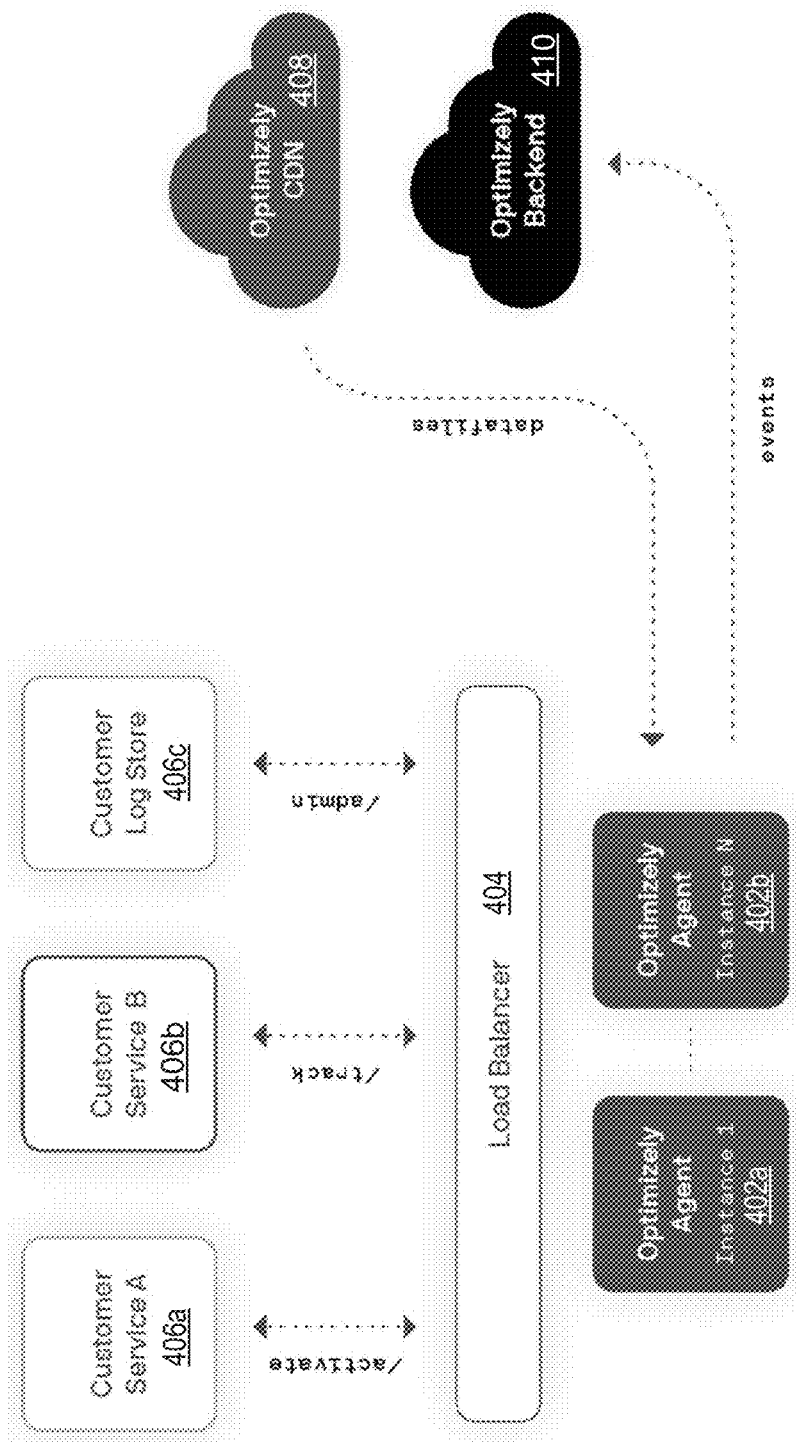
FIG. 4 is a block diagram illustrating an example implementation of a decision service, according to one embodiment.

FIG. 4 is a block diagram illustrating an example implementation of a decision service, according to one embodiment. In one embodiment, the decision service may execute one or more of the functionalities described with respect to FIGS. 1-3B. In one embodiment, a decision service may be run in a variety of modes, corresponding to where the decision service is deployed. In one embodiment, the decision service may be deployed as a process that is co-located with an existing application (e.g., side car or demon deployment mode). In this mode, calls out to the decision service may be relatively low and may not require externalized network calls.

In another embodiment, a centralized clustered mode of operation may allow for the deployment of the decision service to its own dedicated hardware or to its own dedicated cluster. In this embodiment, many applications may be running to form a large scalable unit that it is horizontally scalable to meet the requested volume demands and also to ensure high availability of the decision service. In one embodiment, the clustered mode may correspond to multiple instances of a service behind a common network, with applications pointed to the instances. For example, referring to FIG. 4, two or more instances of the decision service (402a, 402b) may be arranged behind a load balancer or proxy (404) with respect to one or more customer services and/or applications (406a, b, c). Instances 402a, b, may be in communication with one or more A/B testing services and resources, such as a content delivery network (CDN) 408 and backend 410. Data, such as datafiles and event information may be communicated between decision service instances 402a, b and A/B testing services and resources (CDN 408 and backend 410). In one embodiment, the decision service instances themselves can be run via a container or installed directly from a source.

Figure 5A:
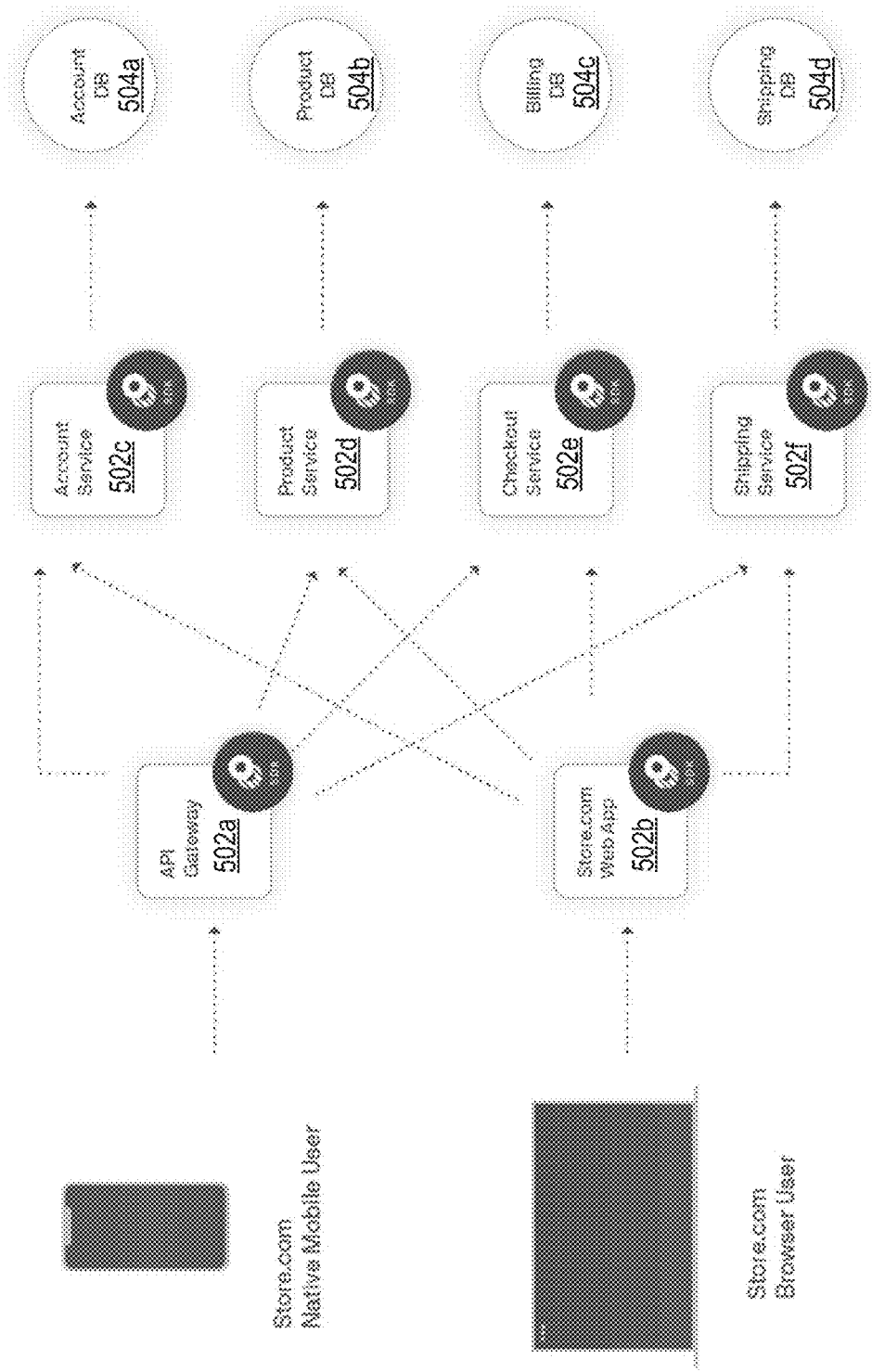
FIG. 5A is a block diagram illustrating use of SDKs installed on each service in a service oriented architecture, according to one embodiment.

FIG. 5A is a block diagram illustrating use of SDKs installed on each service in a service oriented architecture 500A, according to one embodiment. In one embodiment, utilization of the decision service described herein may be advantageous as an alternative or complement to A/B testing logic separated into discrete services that might need to access multiple A/B testing APIs, as shown in FIG. 5A. As shown, without a decision service, six SDK embedded instances may be employed to provide functionality for each of the services provided (502a-f), which may be connected to, and in communication with, one or more databases (e.g., 504a-d).

Figure 5B:
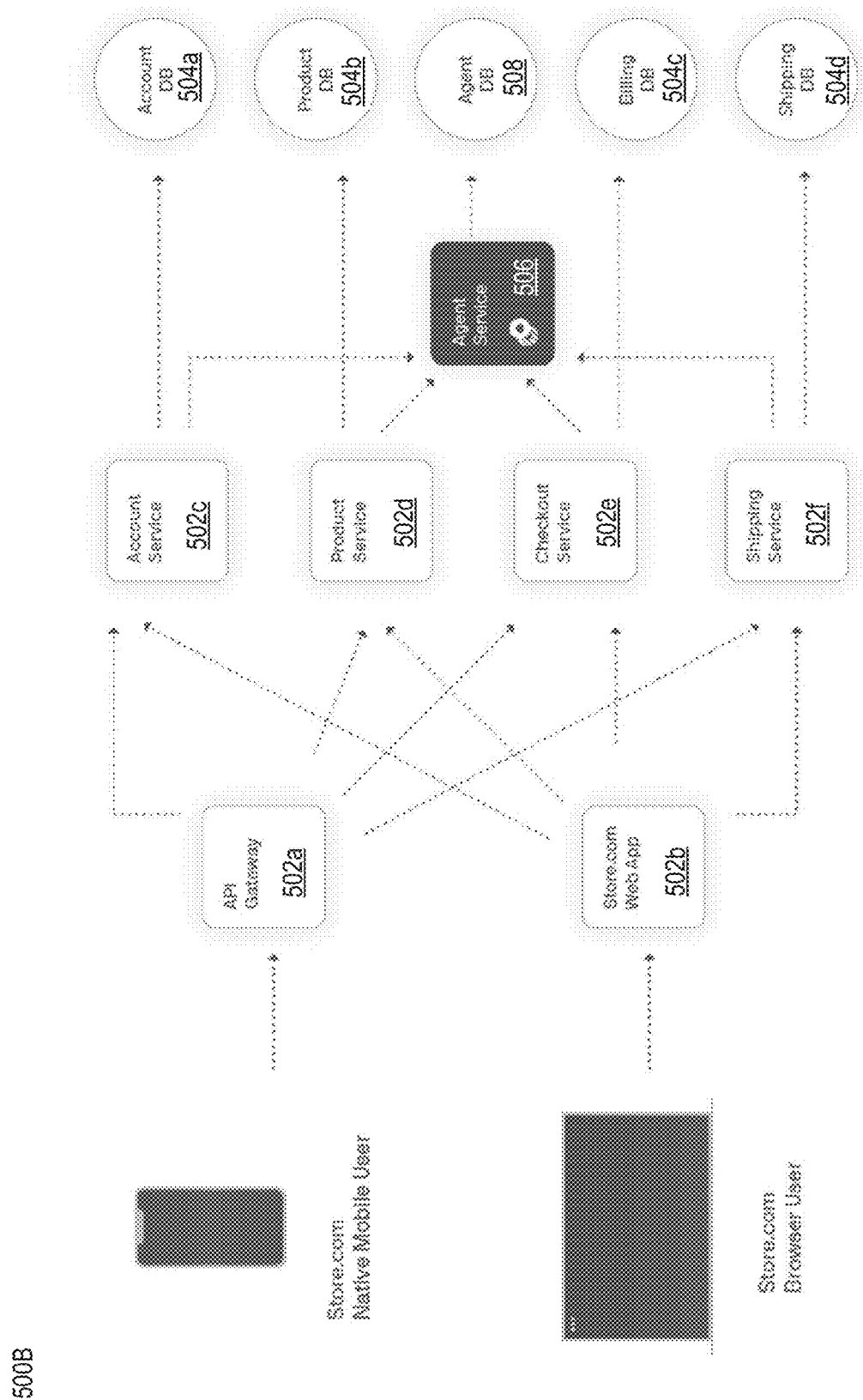
FIG. 5B is a block diagram illustrating use of an agent in a single service, according to one embodiment.

Now referring to FIG. 5B, with the decision service 506, instead of installing the SDK six times, a user may create just one Optimizely instance: an HTTP API that every service can access as needed, which may have access to a decision service database 508, as shown. Utilizing decision service 508 provides a variety of benefits, including those that affect standardization, networking centralization, and languages. For example, in one embodiment, multiple groups or teams may be provided access through decision service 506 to standardize groups' access to the A/B testing service, to better enforce processes and implement governance around feature management and experimentation as a practice. In another embodiment, many SDK instances connecting to an A/B testing cloud service from every node in an application may have negative performance impacts. Here, decision service 508 centralizes the network connection such that one cluster of decision service 508 instances connects to the A/B testing could service for tasks, such as updating data files and dispatching events. In yet another embodiment, decision service 508 may be customized to work with languages that may not be supported by underlying native SDKs.

Turning to the decision service 508 itself, a user may deploy an instance of decision service 508, which again may be an application or microservice that provides an API for a variety of applications of an SDK. Such applications may then connect with decision service 508 to activate experiments, activate feature flags, track conversion events, etc.

In one embodiment, decision service 508 may include an A/B testing SDK, middleware, one or more complementary services that perform a variety of functions. In one embodiment, such complementary services may expose the API required to interface with decision service 508 and allow decision service 508 to monitor its own usage. Complementary services may also perform logging, so that a user can understand how decision service 508 is being used and record information corresponding to how it is being used.

Once an instance of decision service 508 is running a user may connect with decision service 508 by providing an SDK key, which indicates a particular A/B testing environment (e.g., a bundle of future flags, experiments, etc.). In one embodiment, the SDK key may be passed as a header in a calls to decision service 508. When decision service 508 receives that SDK key, processing logic may pull environment-specific data from the SDK (e.g., flags and data files) and hold such in memory so that the user can then connect to decision service 508 to activate feature flags and to activate experiments.

After such authentication is performed, a user may request a decision for a particular feature flag and decision service 508 may return one or more indications of: whether the flag is on or off, are there experiments running, are there variables that the user should be aware of and/or associated with the feature flag, etc. In one embodiment, decision service 508 may also dispatch events to the A/B testing platform. For example, in an experiment is running and a new user is assigned to the experiment, decision service 508 may send data indicating to enable the recordation that the user was assigned to experiment. In other embodiments, decision service 508 may track a conversion and dispatch data for that event to the A/B testing system.

In one embodiment, decision service 508 may further expose an admin API, allowing for additional functionality. For example, the admin API may allow a user to fetch data associated with the health of the decision service 508 instance. In one embodiment, CPU utilization, cluster utilization, memory utilization, etc. of an instance can be measured and recorded. In one embodiment, the decision service also accepts configuration options so that a user may perform various configuration-related functionalities. In another embodiment, the decision service 508 API also supports authentication for applications that are connecting with decision service 508 to run tests. In one embodiment, that authorization may be performed by hooking into a user's existing authentication mechanism. In another embodiment, decision service 508 may be connected to webhooks functionality of the A/B testing platform to be notified whenever there's a change to flags or experiments so that configuration for such may be updated in response to those changes.

Figure 6:
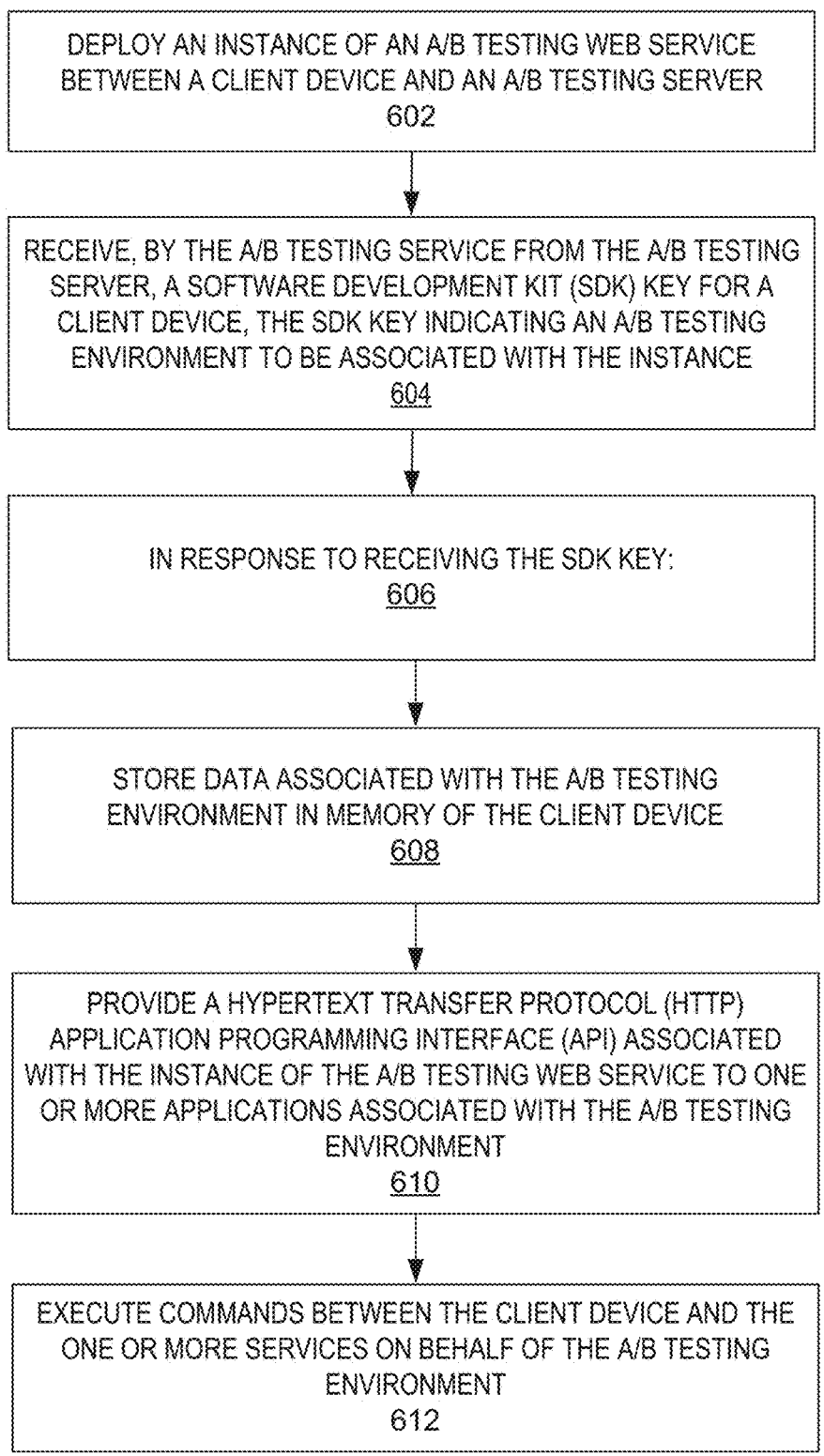
FIG. 6 is a flow diagram of a method of a decision service, according to one embodiment.

FIG. 6 is a flow diagram of a method 600 of a decision service, according to one embodiment. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by the components of system 100 of FIG. 1. Some or all of the steps may be performed by other entities in other embodiments. In addition, other embodiments may include different and/or additional steps, and the steps may be performed in different orders.

In one embodiment, the steps of FIG. 6 may be performed by processing logic of experiment system 105 of FIG. 1. For example, in one embodiment, processing logic is associated with the execution of an A/B testing service, such as the A/B decision service ("agent") described herewith with respect to an A/B testing environment. At block 602, such processing logic may deploy an instance of the A/B testing service between a client device and an A/B testing server. In this way, the decision service may act an agent for the A/B testing service and for the client device.

At block 604, processing logic may receive a software development kit (SDK) key for a client device, the SDK key indicating the A/B testing environment to be associated with the instance. In response to receiving the SDK key (606), processing logic may perform the functionality described with respect to blocks 608-612.

For example, in one embodiment, processing logic may store data associated with the A/B testing environment in memory (608) and provide a HyperText Transfer Protocol (HTTP) application programming interface (API) associated with the instance of the A/B testing service to one or more applications associated with the A/B testing environment (610). In one embodiment, such data include at least one of: information associated with a feature flag or an experiment. In one embodiment, processing logic may activate at least one of: the feature flag or an experiment in response to receiving activation instructions from a client device.

In another embodiment, processing logic may receive a request from the client device for information associated with the A/B testing environment and, in response to receiving the request, provide information associated with a state of a feature flag, a state of an experiment, or one or more variables associated with the feature flag. At block 612, processing logic executes, by a processing device, commands between the client device and the one or more applications on behalf of the A/B testing environment. In one embodiment, processing logic may send the commands though a proxy or load balancer between the client device and the one or more applications.

Processing logic of method 600 may optionally provide additional functionality, as described herein. For example, in one embodiment, processing logic may receive data from the client device, wherein the data corresponds to an assignment of a user to an experiment, an activation of an experiment, an activation of a feature flag, or a tracking of a conversion metric. In response to receiving the data, processing logic may forward the data to the A/B testing environment.

In another embodiment, processing logic may perform various operations associated with authentication, as described herein. For example, processing logic may receive an application program interface (API) request from the client device authenticate the API request to the client device.

In another embodiment, processing logic may perform various administrative operations, as described herein. For example, processing logic may establish a connection to an administrative API of the A/B testing service instance and receive data associated with a health of the A/B testing service instance via the connection.

Figure 7:
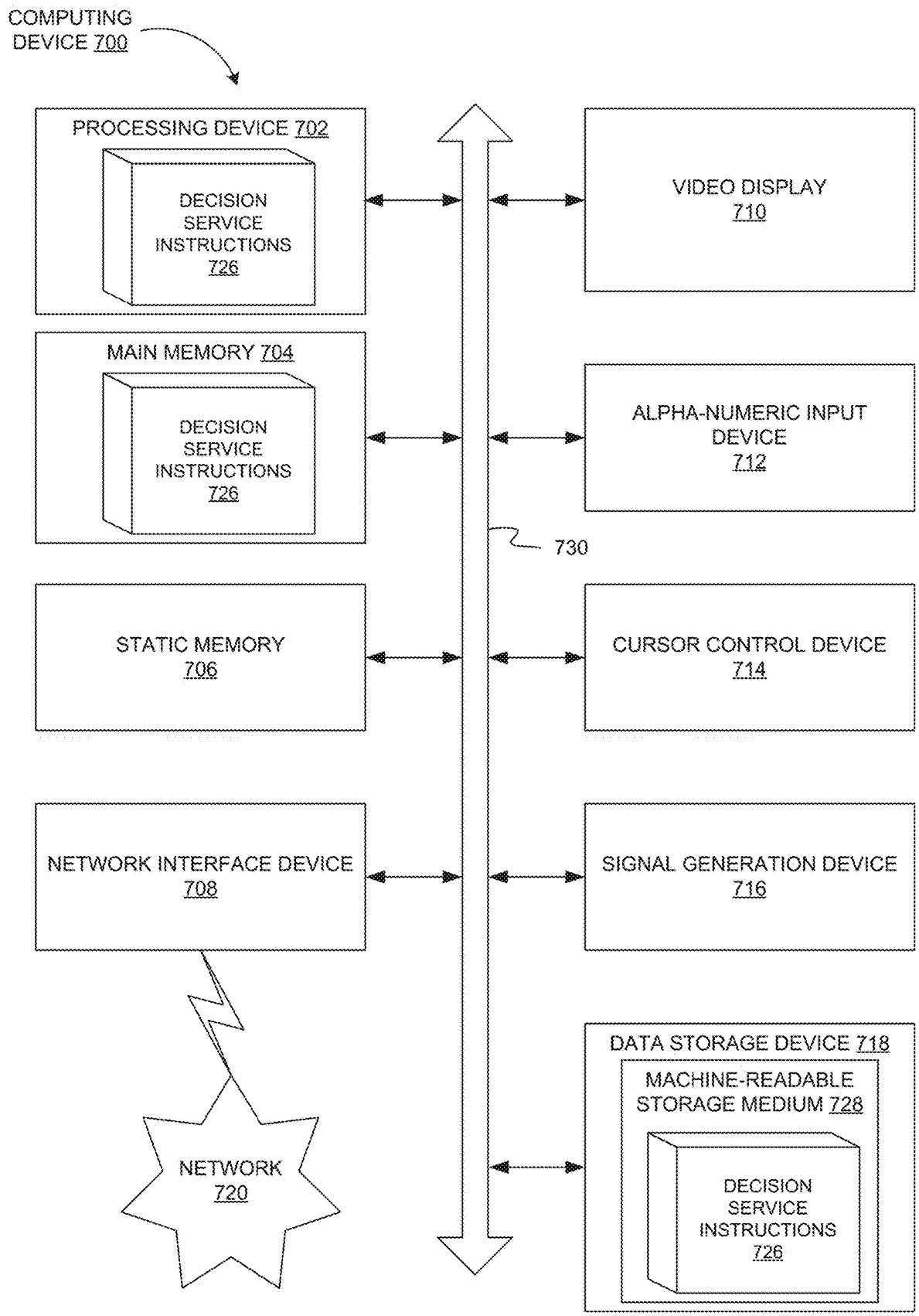
FIG. 7 is a block diagram of a computing device, in accordance with some embodiments of the present disclosure.

FIG. 7 is a block diagram of an example computing device 700 that may perform one or more of the operations described herein, in accordance with some embodiments. In various embodiments, computing device 700 may represent computing devices (e.g., servers) of the experimentation platform, third-party content provider client devices, and/or third-party content provider servers. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of decision service instructions 726, e.g., instructions for carrying out the operations described herein, in accordance with one or more aspects of the present disclosure. Decision service instructions 726 may also reside, completely or at least partially, within main memory 704 and/or within processing device 702 during execution thereof by computing device 700, main memory 704 and processing device 702 also constituting computer-readable media. The instructions 726 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of executing an A/B testing service, the method comprising:
   deploying to a client device an instance of the A/B testing service between the client device and an A/B testing server;
   receiving, by the A/B testing service in the client device from the A/B testing server, a software development kit (SDK) key for the client device, the SDK key indicating an A/B testing environment to be associated with the instance; and
   in response to receiving the SDK key:
      storing data associated with the A/B testing environment in a memory of the client device;
      providing a HyperText Transfer Protocol (HTTP) application programming interface (API) associated with the instance of the A/B testing service to one or more applications associated with the A/B testing environment; and
      executing, by a processing device of the client device, commands of the A/B testing service between the client device and the one or more applications on behalf of the A/B testing environment.

2. The method of claim 1, wherein the data comprises at least one of: information associated with a feature flag or an experiment.

3. The method of claim 2, further comprising activating at least one of: the feature flag or the experiment in response to receiving activation instructions from the client device.

4. The method of claim 2, further comprising: receiving a request from the client device for information associated with the A/B testing environment; and in response to receiving the request, providing information associated with a state of the feature flag, a state of the experiment, or one or more variables associated with the feature flag.

5. The method of claim 1, further comprising: receiving second data from the client device, wherein the second data corresponds to an assignment of a user to an experiment, an activation of an experiment, an activation of a feature flag, or a tracking of a conversion metric; and forwarding the second data to the A/B testing environment.

6. The method of claim 1, further comprising:
   receiving an application program interface (API) request from the client device; and
   authenticating the API request to the client device.

7. The method of claim 1, further comprising sending the commands though a proxy or load balancer between the client device and the one or more applications.

8. The method of claim 1, further comprising:
   establishing a connection to an administrative API of the A/B testing service instance; and
   receiving data associated with a health of the A/B testing service instance via the connection.

9. A system comprising:
   a memory; and
   a hardware processing device, operatively coupled to the memory, to:
   deploy to a client device an instance of the A/B testing service between the client device and an A/B testing server;
   receive, by the A/B testing service in the client device from the A/B testing server, a software development kit (SDK) key for the client device, the SDK key indicating an A/B testing environment to be associated with the instance; and
   in response to receiving the SDK key:
      store data associated with the A/B testing environment in a memory of the client device;
      providing a HyperText Transfer Protocol (HTTP) application programming interface (API) associated with the instance of the A/B testing service to one or more applications associated with the A/B testing environment; and
      execute commands of the A/B testing service between the client device and the one or more applications on behalf of the A/B testing environment.

10. The system of claim 9, wherein the data comprises at least one of: information associated with a feature flag or an experiment.

11. The system of claim 10, the processing device further to activate at least one of: the feature flag or the experiment in response to receiving activation instructions from the client device.

12. The system of claim 10, the processing device further to: receive a request from the client device for information associated with the A/B testing environment; and in response to receiving the request, provide information associated with a state of the feature flag, a state of the experiment, or one or more variables associated with the feature flag.

13. The system of claim 9, the processing device further to: receive second data from the client device, wherein the second data corresponds to an assignment of a user to an experiment, an activation of an experiment, an activation of a feature flag, or a tracking of a conversion metric; and forward the second data to the A/B testing environment.

14. The system of claim 9, the processing device further to:
   receive an application program interface (API) request from the client device; and
   authenticate the API request to the client device.

15. The system of claim 9, the processing device further to send the commands though a proxy or load balancer between the client device and the one or more applications.

16. The system of claim 9, the processing device further to:
   establish a connection to an administrative API of the A/B testing service instance; and
   receive data associated with a health of the A/B testing service instance via the connection.

17. A non-transitory computer-readable storage medium including instructions that, when executed by a processing device, cause the processing device to:
   deploy to a client device an instance of the A/B testing service between the client device and an A/B testing server;
   receive, by the A/B testing service in the client device from the A/B testing server, a software development kit (SDK) key for the client device, the SDK key indicating an A/B testing environment to be associated with the instance; and
   in response to receiving the SDK key:
      store data associated with the A/B testing environment in a memory of the client device;
      provide a HyperText Transfer Protocol (HTTP) application programming interface (API) associated with the instance of the A/B testing service to one or more applications associated with the A/B testing environment; and execute commands of the A/B testing service between the client device and the one or more applications on behalf of the A/B testing environment.

18. The non-transitory computer-readable storage medium of claim 17, the processing device further to:

receive a request from the client device for information associated with the A/B testing environment; and in response to receiving the request, provide information associated with a state of a feature flag, a state of an experiment, or one or more variables associated with the feature flag.

19. The non-transitory computer-readable storage medium of claim 17, the processing device further to: receive second data from the client device, wherein the second data corresponds to an assignment of a user to an experiment, an activation of an experiment, an activation of a feature flag, or a tracking of a conversion metric; and forward the second data to the A/B testing environment.

20. The non-transitory computer-readable storage medium of claim 17, the processing device further to:

establish a connection to an administrative API of the A/B testing service instance; and receive data associated with a health of the A/B testing service instance via the connection.

* * * * *